US009224201B2

(12) United States Patent
Köhler et al.

(10) Patent No.: US 9,224,201 B2
(45) Date of Patent: Dec. 29, 2015

(54) METHOD FOR THE REDUCTION OF ARTIFACTS IN IMAGE DATA SETS AND COMPUTING FACILITY

(71) Applicants: Christoph Köhler, Forchheim (DE); Bernd Schreiber, Forchheim (DE)

(72) Inventors: Christoph Köhler, Forchheim (DE); Bernd Schreiber, Forchheim (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 206 days.

(21) Appl. No.: 14/010,928

(22) Filed: Aug. 27, 2013

(65) Prior Publication Data

US 2015/0030228 A1 Jan. 29, 2015

(30) Foreign Application Priority Data

Jul. 26, 2013 (DE) .................. 10 2013 214 689

(51) Int. Cl.
| | | |
|---|---|---|
| *G06K 9/00* | (2006.01) | |
| *G06T 7/00* | (2006.01) | |
| *G06T 5/00* | (2006.01) | |
| *G06T 5/50* | (2006.01) | |
| *G06T 11/00* | (2006.01) | |

(52) U.S. Cl.
CPC ............. *G06T 7/0012* (2013.01); *G06T 5/002* (2013.01); *G06T 5/50* (2013.01); *G06T 11/008* (2013.01); *G06T 2207/10081* (2013.01); *G06T 2207/20182* (2013.01); *G06T 2207/30016* (2013.01)

(58) Field of Classification Search
CPC ................ G06T 7/00; G06T 7/0012; G06T 2207/10081; G06T 2207/20182; G06T 2207/30016
See application file for complete search history.

(56) References Cited

U.S. PATENT DOCUMENTS

| | | | | |
|---|---|---|---|---|
| 6,570,951 | B1 * | 5/2003 | Hsieh ................................ 378/4 |
| 7,027,558 | B2 * | 4/2006 | Ghelmansarai et al. ........ 378/65 |
| 7,639,772 | B2 * | 12/2009 | Nishide ................. G06T 11/005 378/4 |
| 7,778,392 | B1 * | 8/2010 | Berman et al. ................. 378/210 |
| 8,135,186 | B2 * | 3/2012 | Bouman ............... G06T 11/006 378/19 |
| 8,340,381 | B2 * | 12/2012 | Franaszek et al. ............ 382/128 |
| 2004/0264628 | A1 * | 12/2004 | Besson .................. A61B 6/032 378/5 |
| 2011/0135182 | A1 * | 6/2011 | Goto ...................... A61B 6/032 382/131 |
| 2013/0259355 | A1 * | 10/2013 | Kyriakou ...................... 382/132 |
| 2015/0030228 | A1 * | 1/2015 | Kohler et al. .................. 382/132 |

FOREIGN PATENT DOCUMENTS

| | | |
|---|---|---|
| DE | 102005028216 A1 | 12/2006 |
| WO | WO 2005078661 A1 | 8/2005 |

* cited by examiner

*Primary Examiner* — Gregory M Desire

(57) ABSTRACT

A method for the reduction of artifacts based on an unequal representation of the same material classes in various locations, in particular of cupping artifacts, in a three-dimensional image data set, reconstructed from two-dimensional x-ray projection images is provided. An image datum, describing an attenuation value, is allocated respectively to a voxel, wherein at least two material class regions are located in a post-processing step, which receive, in particular, image data, which is homogeneously distributed and lies in an expected material class interval of the attenuation values, and, considering at least one characteristic of the material class regions, calculates a smooth homogenization function, which is to be applied to the image data of the entire image data set and is applied to the image data of the image data set.

19 Claims, 2 Drawing Sheets

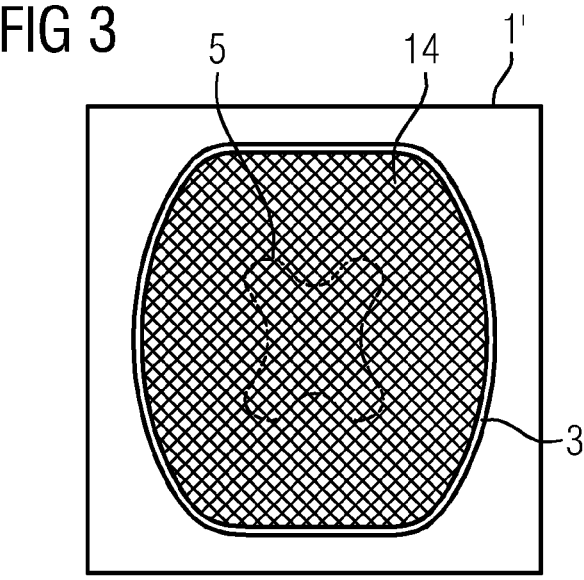
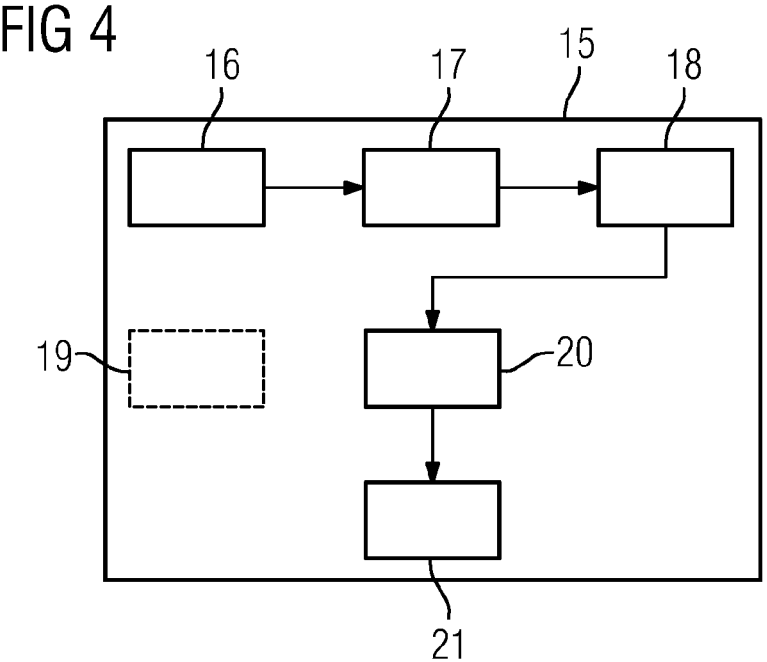

METHOD FOR THE REDUCTION OF ARTIFACTS IN IMAGE DATA SETS AND COMPUTING FACILITY

CROSS REFERENCE TO RELATED APPLICATIONS

The present application claims priority to European Patent Office application No. 102013214689.2 DE filed Jul. 26, 2013, the entire content of which is hereby incorporated herein by reference.

FIELD OF INVENTION

The invention relates to a method for the reduction of artifacts based on an unequal representation of the same material classes in various locations, in particular of cupping artifacts, in a three-dimensional image data set, reconstructed from two-dimensional x-ray projection images, in which an image datum, describing an attenuation value, is allocated respectively to a voxel.

BACKGROUND OF INVENTION

The reconstruction of three-dimensional image data sets from two-dimensional projection images is already widely known from prior art. Computed tomography facilities (CT facilities) are mostly used to produce such three-dimensional image data sets in the x-ray imaging region, which are designed to be dedicated to the reconstruction of higher dimensional image data sets. Since that time, however, it has also been suggested to use other x-ray facilities, which can receive projection images by various projection directions in order to construct three-dimensional image data sets. A known example of this are C-arm x-ray facilities, which have a C-arm, on which an x-ray emitter and an x-ray detector, which lie opposite one another, are arranged. The receiving arrangement formed in this way can, for example, be rotated around the patient, in order to be able to receive the projection images and reconstruct a three-dimensional image data set therefrom.

As a result of the receiving and reconstruction of three-dimensional image data sets, artifacts often remain in the image data. Many algorithms are known for the elimination thereof, which, however, are not always able to completely eliminate the artifacts. Particularly problematic herein in the location chamber are low-frequency homogeneity artifacts, i.e. effects, which cause the same materials or generally the same material classes to not be imaged evenly in all locations of the image data set, and therefore to receive the same attenuation value.

It has already been indicated at this point, that the attenuation values in the region of the x-ray imaging are often specified as so called HU-values (Hounsfield units), which, however, already begin in the negative region, for example at −1000. Therefore, it is well-established to add an offset to the attenuation values in HU, for example of 1024, in order to receive principally positive image data, which can, if necessary, be more easily processed. Nevertheless, a conversion to HU is, of course, always possible without any problems.

In the case of the HU it is known that there exists a correlation with the attenuation coefficients of the tissue that is being considered, as HU are defined ultimately by the deviation from the attenuation coefficient for water, therefore set an attenuation value for water of 0 HU. Due to the described effects it can occur that despite the same present material class, and therefore attenuation coefficients lying in the same region, various attenuation values are present as an image datum in various regions of the three-dimensional image data set, in such a way that there is no homogeneity. Such homogeneity artifacts mainly pose a problem if low-contrast details should be identified in an image data set, for example a hemorrhage, a tumor or an infarct region.

Various homogeneity artifacts are known. Firstly, the so-called cupping artifacts exist, which mainly stem from scattered radiation. This causes the image data of the even material class at the edge of the image to become higher or lower, such that it results in a type of "bowl shape". Capping artifacts are also known, which can result from irradiation that is too high or an increase of density value because of increasing beam hardening. Such homogeneity artifacts are particularly noticeable when the human head is being recorded, as mainly soft tissue is present in the inner chamber of the head, which can be understood as an attenuation class with extremely similar attenuation values. If, for example, an aneurysm should be detected, small differences in contrast are to be calculated. Problems also often occur in the case of such head recordings with regard to cupping artifacts, after the image data can increase to the back part of the skull, after increased beam hardening has occurred through the thicker part of the cranium (calotte).

These physical effects can, as has already been explained, be partially eliminated through software corrections, which is part of the pre-processing of the measured projection images, before the projection images are used as input data for the reconstruction algorithm. These software corrections, for example a scattering correction or a beam hardening correction, clearly increase the quality of the three-dimensional image data set; however, despite the use of these algorithms, there still remains a recognizable mass of inhomogeneity in the reconstructed three-dimensional image data set.

SUMMARY OF INVENTION

The object of the invention is therefore to specify a method that can be implemented after the reconstruction of the three-dimensional image data set, which increases the homogeneity of the image data set with regard to the same attenuation coefficients and thus reduces homogeneity artifacts, in particular those remaining after the use of correcting algorithms.

In order to solve this object, it is provided according to the invention in a method of the type cited in the introduction, that at least two in particular homogeneously distributed material class regions are located in a post-processing step, which contain image data, which lies in an expected material class interval of the attenuation values, and, considering at least one characteristic of the material class regions, calculates a smooth homogenization function, which is to be applied to the image data of the entire image data set, and is applied to the image data of the image data set.

Here, it is to be noted first of all that, in the case of the three-dimensional image data set, which is considered here, it can also, of course, essentially be a sub data set of a larger volume data set, for example if regions of the material class, or those that support the use of a determined form of homogenization function, were cut out of such a larger volume data set. Currently with regard to the recording of the head of a patient, the method is also, however, applied particularly advantageously to a complete, reconstructed, three-dimensional image data set of the head, as is explained in more detail below.

The basic idea of the present invention is therefore to calculate a homogenization function, which ultimately looks to match image data to one another at least in the regions of the material class and therefore would like to avoid deviations in the representation of the same materials. In order to be able to detect such a homogenization function, it is suggested to locate regions in the three-dimensional image data set that can be allocated to the material class by the rough location of the attenuation values thereof. This is because it is already known in advance which material class is expected with which attenuation values, which is described by the material class interval. If it, for example, concerns carrying out the homogenization with regard to soft tissue, it is known that the attenuation values thereof lie in the region of, in particular just over, water, in such a way that, for example, the material class interval can be chosen from −50 HU to +100 HU. If the image data of a candidate region of the three-dimensional image data set lies inside this material class interval for the attenuation values, which, as will be more closely explained, for example, can be calculated by statistical analysis of the image data in the candidate region, it is assumed that the candidate region represents the material class and is thus a material class region. If several of such material class regions, in particular distributed evenly over the three-dimensional image data set, are now known, these can serve as input information for determining a homogenization function, as ultimately regions of the material class are known according to the type of support location and it can therefore be concluded on the one hand how far these deviate from one other or a set value (target value), but additionally can be inferred on other regions of three-dimensional image data sets, which are not contained within the attenuation class regions. This means that the homogenization function can be determined for the entire image data set. In other words, therefore, identifiable regions of the material class, wherein, of course, background knowledge of the image data set can be received, is located and, from its corresponding deviation from one another or from a target value, a route can be determined to achieve alignment both for these attenuation class regions and for other regions of the image data set.

As has already been explained, the method is particularly suited to soft tissue as a material class, in particular in the region of the head of a patient.

After the homogenization function is smoothly determined or this is imposed as a condition for the homogenization function, it is ensured that contrast changes are maintained, in order to be able to distinguish structures inside the material class. This makes the method extremely robust, wherein this robust nature can also be further increased, if it is provided that the homogenization function is restricted to an admissibility interval of 1, described by a maximum distance, before its multiplicative application to the image data, wherein the distance is chosen between 0.1 and 0.3, preferably 0.2. For example, the determined homogenization function can then thus be so restricted, that it only assumes values of 0.8 to 1.2, thus ruling out a massive change in the image data of the image data set. Thus a clear improvement in the image quality and a reduction of artifacts is achieved; however, the indicative value of the three-dimensional image data set is not affected by means of the method according to the invention.

As has already been mentioned, the main method suggested by the invention for the determination of the homogeneity function is the use of a target value, to which there should be homogenization, and the production of support regions (so the material class regions), from which a support value, which in particular deviates from the target value, can be derived. The target value thus does not necessarily have to represent the set value for the material class (or a determined member of the material class), but can also be provided by the three-dimensional image data set, for example as a value, which is present centrally. The homogeneity function can then occur in particular through a "fit" on support locations provided by the material class regions, in particular deviations from the target value.

In most cases the homogenization function, or a sub-function to be determined, will be characterized by function parameters, which for example can be determined in an optimization method, which will be even more closely explained later. The specific choice of the form of the homogenization function is thus carried out, preferably depending on background knowledge, such that it is, however, smooth. Fundamentally, a shape corresponding to the artifacts to be corrected, which can incidentally also be present in a superimposed form, is formed when there are cupping artifacts, so for example even a type of "bowl shape". It has been shown, for example, that polynomial, in particular quadratic, and exponential terms can be used appropriately.

It is particularly appropriate in the scope of the present invention if, before carrying out the post-processing step, at least one algorithm for the reduction of artifacts is applied to the projection imaging and/or the image data set and/or the post-processing step is the last step of a post-processing procedure before a representation of the image data set. As has already been mentioned, algorithms for the reduction of artifacts are already known from prior art, which, however, are especially applied to the projection images, for example as part of a scattered radiation correction and/or of a beam hardening correction. These algorithms often do not eliminate all artifacts, but reduce them in advance, in such a way that it is advantageously possible by means of the method according to the invention, to carry out a further reduction of the artifacts, in particular if necessary also to eliminate further the last disruptive remains of artifacts. Furthermore the post-processing step can, in particular, be the last step of a post-processing procedure before a representation of the image data set, therefore can include the last preparation of the image data for the representation. This is particularly appropriate in conjunction with an observation, carried out in image slices, as is explained below in more detail. Then a correction for the further homogenization of the image data set can be carried out, for example, after a so-called multiplanar reconstruction (MPR, also multi planar reformation), before the representation.

As has already been explained, the method according to the invention is applied particularly advantageously to a three-dimensional image data set showing the head of a person. These three-dimensional image data sets are characterized by the fact that most of the already mentioned soft tissue is present in the centre, so in the inside, of the head, which is only framed outside the structures of the cranial bone. Currently in the case of such three-dimensional image data sets, cupping artifacts and other homogeneous artifacts often form, which are also striking because of the large region of soft tissue, which does not always apply in the case in other regions of the body.

In an appropriate embodiment of the present invention it can be provided that the image data set is divided into image slices along a dividing direction, wherein for each image slice an image slice homogenization function is determined and the homogenization function for the entire image data set is derived from the image slice homogenization functions. Also algorithmically and relating to the computing power, it is therefore appropriate not to consider the entire image data set at the same time, but instead to use a break down into image slices, wherein each image slice preferably has the layer thickness of one voxel. Such a division into image slices is often already present in the preparation of the representation, wherein the division direction, for example, is chosen as the axial direction, in particular also in the case of the head of a person. Methods are already know from prior art, which produce such representing image slices from three-dimensional image data sets in ultimately any direction that can be chosen, for example the method of the already mentioned multi planar reconstruction (MPR, often also multi planar reformation). These image slices can then for example be considered individually in an appropriate manner as the last post-processing step before the representation of the image slices, before the homogenization function for the entire three-dimensional image data set is calculated.

Of course the homogenization function should, however, also be smooth in the division direction, such that it can be provided for the combination of the image slice homogenization function with the homogenization function for the three-dimensional image data set, that the homogenization function is calculated as a moving average by the image slice homogenization functions, in particular by filters with a low-pass filter in the division direction. For example, it can be provided in this context that, in the case of the moving average 4 to 6, preferably 5, adjacent layers are considered in both directions. In this way jumps between the individual layers are preferably avoided.

An advantageous, specific further embodiment of the invention provides that, firstly, for each image slice, a focus of the image slice and/or a target value is calculated, wherein for the calculation of the target value, a central region that lies around the focus is determined, for which a average attenuation value is calculated as a target value, or a target value is specified as a value expected for the material class, in particular an HU value. Therefore a target value can be produced for each of the image slices, as has already been principally discussed, on which ultimately the homogenization will be carried out, as will be explained further in detail below. This target value can be specified as a type of set value, for example for soft tissues in a region of 0 to 25 HU. However, it can also be calculated from the respective image slice. For this purpose it is offered, in particular if cupping artifacts can be present, to consider a central region, which can be extended to the focus, which can also be further used elsewhere usefully, said focus for example being able to play a role in the definition of the basic form of the homogenization function. If only one such focus is calculated, it is defined in a central region, which for example can comprise 50 to 100 by 50 to 100 pixels of the image slice, preferably 80 by 80. An average attenuation value, which is derived from this, so an average image datum, can be calculated as a target value.

Specifically, it can be provided for determining the focus, that the image is binarized by means of an object threshold value, which describes an attenuation value of an object depicted in the image slice. This means that an object threshold value is specified, via which it is possible to define the location of the object, which is really to be seen in the image, for example the head of a patient; each pixel of the head is then marked as "1", each pixel, which lies outside of the object as "0". A value of 0 HU (water) or something below that can then be set as an object threshold value, for example, if the soft tissue and other component parts of the human body are represented. If only one such binarized image is present, a focus determination is carried out in a known manner, which results in pixel coordinates for the focus. This then relates to the object, which is actually represented, which then is also the main target of the homogenization.

For the determination of the average attenuation value, it can be provided that only image data of the central region is considered, which is in a rough estimate interval, which is dependent on the material class. In this way cases should be intercepted, in which a material is found in the middle of the image that can also no longer be allocated to the material class when artifacts are observed. Therefore the rough estimate interval is chosen in such a way that it allows truly large fluctuations around the expected values for the material class, yet strongly rules out deviating attenuation values as image data, for example in the case of soft tissue as the material class of bone or air. If soft tissue is the material class to which the present method is related, the rough estimate interval can be chosen, for example, from −80 to +150 HU. It is thus, as explained, wider than the material class interval.

A specific algorithm for carrying out the method according to the invention can also provide procedures that intervene if a large enough statistical basis for the determining of the average attenuation value should not be given, for example for when the image data has too few pixels in the rough estimate interval. Here can be provided, for example, a threshold value, in the case of whose lower deviation the target value is determined elsewhere, for example as a common target value for the material class or similar, as has previously been explained.

A further advantageous specific implementation of the method according to the invention in this context provides that, for each image slice, candidate regions which are in particular evenly divided and/or cover the entire image slice are defined and for each candidate region an average image datum, a maximum image datum and a minimum image datum is calculated via the pixels in the candidate region, wherein a candidate region is determined as a material class region, if the average image datum lies in the material class interval as well as if the minimum is larger than a predetermined minimum value and the maximum is smaller than a predetermined maximum value, wherein the minimum value and the maximum value describe acceptable attenuations for the material class.

As has already been mentioned, in this case the material class interval is narrower than the rough estimate interval, which is used in particular, such that the material class interval for soft tissue can for example lie from −50 to +150 HU. The candidate regions, which can also be identified as ROI, in this case can be chosen to be truly small. For example, it is conceivable that the candidate regions have a size of from 8 to 12 by from 8 to 12 pixels, preferably 10 by 10 pixels. The image slice can be, for example, completely covered by these candidate regions, by these being defined by a latticed division of the image slice. But it is also possible to use fewer candidate regions, which then are present preferably with at least even distribution over the image slice. After the candidate regions have been defined, three statistical sizes for each of these three candidate regions are determined, namely the average image datum, the minimum image datum and the maximum image datum. These are, as described, checked against the conditions, which describe whether it is a material class interval, therefore the candidate region can be classified relatively certainly in a representational manner as the material class. The minimum value and the maximum value thus describe acceptable deviations, wherein it is noted that exemplary embodiments are also conceivable, which check whether the minimum value is fallen short of or exceeded for several pixels of the candidate region. Ultimately, however, it is hereby ensured that no outliers are present that are too strong. For example, for soft tissue a minimum value in the region of −250 HU and a maximum value in the region of +400 HU are chosen.

Furthermore it is to be appropriately ensured in the method according to the invention, that a sufficient number of material class regions are present, such that the determination of the homogenization function can be carried out reliably. Exemplary embodiments are conceivable, in which the conditions are "softened", so to speak, in the case of too few located material class regions, in order to locate further material class regions. Thus in a specific, appropriate embodiment it can, for example, be provided, that, if the total number of material class regions is smaller than a predetermined first threshold value and/or the total number of material class regions in a quadrant, which is defined by the focus, is smaller than a predetermined second threshold value, then candidate regions are also used as material class regions, for which the minimum is greater than the predetermined minimum value and the maximum is smaller than the predetermined maximum value, wherein the average image datum is specified as the target value for these material class regions. One such approach allows, in particular, edge layers to still be adequately used. If the example of a recording of the human head is used again, less soft tissue is present in the edge layers, however possibly more bone material. This causes the average image data to be pulled slightly from the material class region, but often, on the whole, still remains between the boundaries predetermined by the minimum value and the maximum value. It has been shown that such candidate regions can also still be considered as material class regions, if in future the average image datum is "forced" to the target value itself. Thus a further meaningful calculation of the homogenization function is also possible in image slices, in particular image slices lying on the edge, in which the otherwise only very few material class regions would be located.

If the material class regions and their characteristic values, in particular the average image data, were determined, it is then possible to calculate the image slice homogenization function. Here it can be appropriately provided that for each image slice, the function parameters describing the image slice homogenization function are calculated in an optimization method, wherein the cost function is set by the target value as the sum of the deviations of the average image data multiplied by the homogenization function at the location of the material class region. This cost function thus strives towards a homogenization, such that the optimization method locates a homogenizing solution. In order to avoid the location of a local minimum by the optimization method, it can be provided that the optimization method is carried out many times, in order to achieve such a level of plausibility.

As has already been explained, the specific approaches for the image slice homogenization functions are strongly dependent on the specific underlying imaging tasks, in particular on the represented region of the human body, and on the expected artifacts. A fundamental requirement for the image slice homogenization function is that it is, if possible, smooth, such that present contrast variations, on which, for example, a diagnosis is made, are not destroyed. However, it can be furthermore appropriate that the image slice homogenization function is set in such a way that, particularly if the target value has been determined as the average attenuation datum of the central region, its application for the focus always produces the target value and that this therefore has the value of 1 on the focus when there is multiple application of the image slice homogenization function. Currently in the case of cupping artifacts, for which attenuation values are ascertained, which increase or decrease outwards starting from the focus for the material class, this is an appropriate approach. It is otherwise offered, as has already been indicated, to use exponential and polynomial proportions, wherein, for example, an exponential proportion of the image slice homogenization function can describe cupping artifacts, and other influences can be ascertained via the polynomial proportion, in particular for varying directions separated by Heaviside functions.

Also as part of the determination of the homogenization function, here it can once again be checked, specifically of the image slice homogenization function, whether sufficient material class regions are present, such that the homogenization function can be considered reliable. Thus it can be specifically provided that in a case, in which the total number of material class regions is smaller than a predetermined first threshold value and/or the total number of material class regions in quadrants defined by the focus is smaller than a predetermined second threshold value, the image slice homogenization function is specified as a multiplication by 1 for the entire image slice. This is a type of security question, which avoids a determination of a specific image slice homogenization function in case of doubt, if too little a data basis is present, and then firstly no change is set for this image slice, which can be changed again, however, in the case of conversion to the entire homogenization function for the three-dimensional image data set, if sufficient information from material class regions is present in neighboring layers.

It has been indicated that the specific approaches described here for the determination of the homogenization function are also conceivable principally in a manner independent of the image slices, therefore for the entire image data set, wherein, for this, the expenditure may increase and the homogenization functions must be set in a more complex manner. It is also principally conceivable for the entire image data set to determine a focus, for example after binarization, in order to then define a central region, this time with voxels, which can be taken as a basis for the target value, or to otherwise define the target value. In the entire image data set a definition of groups of voxels as candidate regions can then also occur in a corresponding manner, which can be checked via corresponding criteria and can be classified as material class regions, if they fulfill the criteria. The optimization then occurs over the entire image data set. According to the invention, it is, however, preferred, to carry out a distribution into the image slices, preferably those, which should be displayed anyway in an occurring step.

The homogenization function is, as has been explained, calculated for the entire image data set. Thus it can, of course, be desired to exclude regions, which can be securely allocated to other material classes, from the application of the homogenization function or to only apply the homogenization function there in a restricted manner, after the homogenization function targets the material class, in particular soft tissue. It is thus firstly conceivable that the homogenization function is only applied to an application interval of possible attenuation values containing the material class interval. According to the invention it is, however, preferable if the application of the homogenization function is continued in an attenuating manner, outside the application interval with increasing distance from the application interval by smooth continuation. A smooth application of the homogenization function is preferred, as then the quality of the final image is clearly improved. This means that the homogenization function is only applied in an unrestricted manner in an application interval, for example multiplicatively, said application interval again being chosen to be wider than the material class interval, in particular also wider than the rough estimate interval. Conceivable edge values for the application interval for soft tissue are, for example, −100 HU and +400 HU. Apart from this application interval, the homogenization function is then preferably still only used in an attenuated manner, in order to avoid too strong a change in image regions not belonging securely to the material class.

At this point it is further indicated that it can be appropriate if the image data of the image data set is restricted after the application of the homogenization function to a permitted interval. Not only the HU value, but also grey values, offset by an offset of the HU values, are mostly limited to a determined, permitted interval, which should also be maintained after the homogenization method is carried out according to the invention, in order to ensure the compatibility of the output-image data set with further steps, which are carried out, for example with a representation.

Homogeneity artifacts occur, as was already indicated in the beginning, rather infrequently in clearly perceptible forms in the case of computed tomography image data sets, which were received with a computed tomography device, as a very high image quality is given there. This is different in the case of x-ray devices having a C-arm, on which an x-ray emitter and an x-ray detector, which lie opposite one another, are arranged. In this case, different effects occur, which can manifest as homogeneity artifacts in the case of a use of the x-ray device having a C-arm for receiving the projection images for the three-dimensional image data set. Therefore the method according to the invention can be applied particularly appropriately to three-dimensional image data sets, which are reconstructed from projection images received with an x-ray device having a C-arm.

In addition to the method, the present invention also relates to a computing facility for the reduction of artifacts based on an unequal representation of the same material classes in various locations, in particular of cupping artifacts, in a three-dimensional image data set, reconstructed from two-dimensional x-ray projection images, in which an image datum, describing an attenuation value, is allocated respectively to a voxel, the computing facility having a location unit for the location of at least two material class regions containing image data, which is, in particular, homogeneously distributed and which lies in an expected material class interval of the attenuation values, a homogenization function calculation unit for the calculation of a smooth homogenization function, which is to be applied to the image data of the entire image data set, considering at least one characteristic of the material class regions, and a correcting unit for the application of the homogenization function to the image data of the image data set. All embodiments concerning the method according to the invention can be transferred analogously to the computing facility, with which the same advantages can be achieved.

In particular, the computing facility can be part of an x-ray device, for example part of an image method or of an x-ray device. In this case it is particularly useful to provide the computing facility in an x-ray device with a C-arm.

The method according to the invention can also be realized as a computer program, which carries out the method according to the invention, if it runs on a computing facility. The computer program can be saved on a non-transient data medium, for example a CD-ROM.

BRIEF DESCRIPTION OF THE DRAWINGS

Further advantages and details of the present invention result from the exemplary embodiments described below as well as by means of the drawing. Here are shown.

DETAILED DESCRIPTION OF INVENTION

Figure 1:
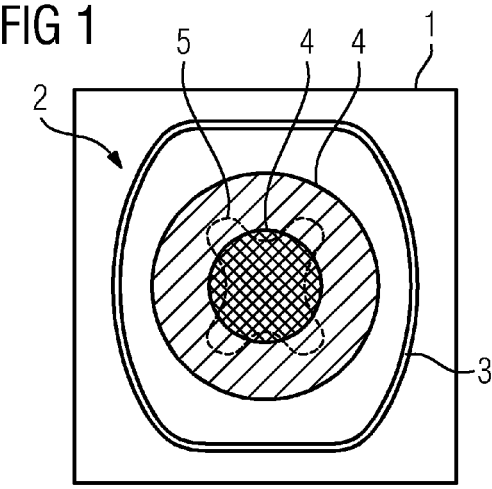
FIG. 1 a schematic diagram of an image slice having a cupping artifact,
FIG. 2 a flowchart of the method according to the invention,
FIG. 3 the image slice of FIG. 1 after a correction, and
FIG. 4 a computing facility according to the invention.

FIG. 1 illustrates the problem underlying the invention by means of an image slice 1, to be shown, of a three-dimensional image data set, which was reconstructed from two-dimensional projection images having a C-arm x-ray device. The image slice can, for example, be formed as part of a multiplanar reconstruction (multi planar reformation), wherein the dividing direction of the three-dimensional image data set is the axial direction. The three-dimensional image data set shows the head 2 of a patient, in the case of which the soft tissue which lies inside the head is outwardly adjacent to the cranium 3 (and a layer of skin, which is not shown in more detail here). As is indicated by the regions 4, which in reality are, of course, not closely adjacent, the soft tissue is represented ever more clearly towards surface, wherein it is normally a fluid method. This means that the attenuation value for one and the same material class, here also soft tissue, appears to increase ever more towards the surface, which is, of course, not correct, even if contrast changes because of structures 5 inside the soft tissues definitely occur and are also desired. The artifact, which is increased or decreased by the image data for the same material class towards the surface, is identified as a cupping artifact and is caused, for example, by scattered radiation.

The cupping artifact is an example of a homogeneity artifact, which means that a material to which a determined, fixed attenuation value should be allocated is, however, imaged in varying values in the image data. The inhomogeneity in the image data set therefore refers to materials, wherein presently a determined material class is considered, here the soft tissue in the brain, for which a homogenization in the method according to the invention should be achieved, and in such a way that contrasts to relevant structures as part of the image evaluation are not negatively influenced, but the entire readability and quality of the image data set is improved.

Below is described an embodiment of the method according to the invention, which relates to a three-dimensional image data set of the head of a patient, which is already disassembled into image slices, which are consecutive in the axial direction, as part of a multi planar reconstruction. Previous corrections have already been carried out on the underlying projection images, which were received with a C-arm x-ray device. Here an algorithm for the correction of scattered radiation and an algorithm for the correction of beam hardening were applied. As the last step of a post-processing method before the display of the image slices, the method according to the invention should, as far as possible, eliminate the remaining artifacts as part of a homogenization.

In this case it is still noted at this point, that also, if the parameter or the limit values are often given as HU values, the image data itself does not have to be HU values, but, for example, can be grey values, and the HU values have a specific offset, for example an offset of 1024 in order to always receive positive values. Nevertheless the conversion is, of course, trivially possible, and therefore also the comparison.

Figure 2:
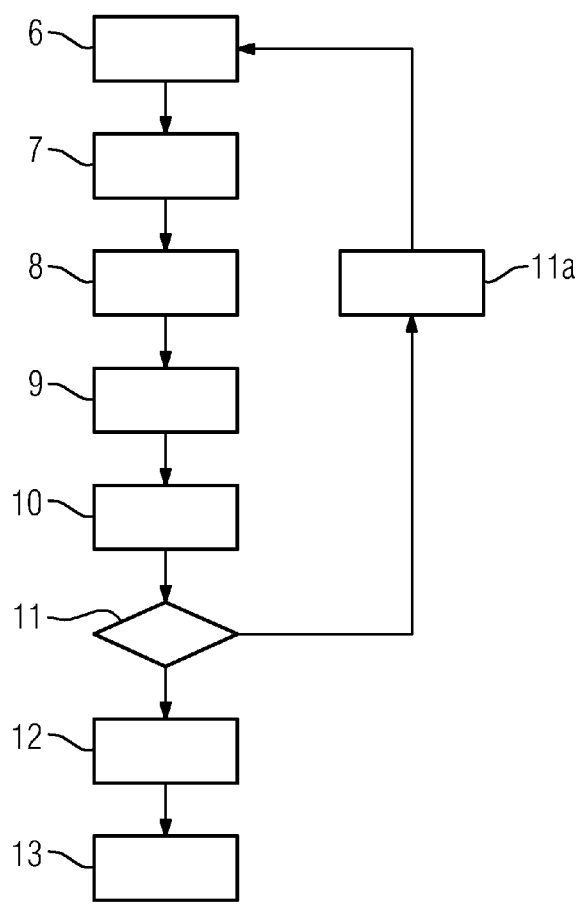

FIG. 2 shows a flow chart of the exemplary embodiment. In this case the steps 6 to 10, as will be further explained, are carried out for each image slice, which means that firstly an image slice homogenization function is calculated for the individual image slices, as is explained in more detail below.

In a step 6, the focus is determined for the currently considered image slice. For this purpose it is provided, to produce a binary image according to $$b(i, j) = \begin{cases} 1, & \text{if } g(i, j) \geq \text{Threshold\_Binary\_Image} \\ 0, & \text{if } g(i, j) < \text{Threshold\_Binary\_Image} \end{cases}$$

wherein Threshold_Binary_Image is an object threshold value, such that therefore the object, which is actually to be seen in the image slice, here the head, is selected. For example the object threshold value can be chosen as 0 HU or something lower. g(i, j) is the image datum on the pixel i, j. Then, if the image slice is received as lying in the x-y plane, wherein x corresponds to the i direction and y to the j direction, the coordinates of the focus can be calculated according to $$x_C = \frac{\sum_{i,j} i \cdot b(i,j)}{\sum_{i,j} b(i,j)} \text{ and } y_C = \frac{\sum_{i,j} j \cdot b(i,j)}{\sum_{i,j} b(i,j)},$$

as this is principally known.

In a step 7 a target value is then specified. To that end, a central region around the focus $(x_c, y_c)$ is firstly specified, here with the dimension of 80×80 pixels. Then the following method is carried out:

Firstly the target value is set to zero, precisely like the number of the pixels contributing to the target value, and a loop is run over all pixels of the central region. For each image value g(x, y) of a pixel it is checked whether the criterion $$\tau_{Pixel,Min\_for\_Targetvalue} \leq g(x,y) \leq \tau_{Pixel,Max\_for\_Targetvalue} \quad (1)$$

is fulfilled, whether therefore the image datum g(x,y) lies in a rough estimate interval, therefore somehow corresponds to the possible region on attenuation values for the attenuation class. Presently, $\tau_{Pixel\_Min\_for\_Targetvalue}$=−80 HU and $\tau_{Pixel\_Max\_for\_Targetvalue}$=150 HU are set for the soft tissue. In this way, if possible, structures which are possibly not soft tissue are excluded.

If the criterion (1) is fulfilled, then g(x,y) is added to the target value and the number of pixels contributing to the target value is increased by one. In such a way, after all pixels of the central region have been processed, an average attenuation value can be calculated by dividing the target value, which so far contains cumulated image data, by the number of contributing pixels.

It is optional to further check how high the number of contributing pixels is. If this number lies under a predetermined limit number, for example under 100 or 50, a predetermined target value can be used instead of the average attenuation value, for example a target value of 0 HU to 50 HU, in particular 25 HU, as the attenuation value expected for the material class soft tissue. A target value of 0 HU would result in a type of "water calibration".

In an alternative embodiment it is also conceivable to specify the target value in step 7, principally to the predetermined value, as is described above, for example 25 HU.

In a step 8 the material class regions are then located. For this purpose the candidate regions covering the image slice are firstly defined, presently with a size of 10×10 pixels. For each of these candidate regions is determined:
the average value of its image data as an average image datum $\text{mean}_{ROI}$,
the maximum of its image data $\text{max}_{ROI}$, and
the minimum of its image data $\text{min}_{ROI}$.

The candidate region is classified as a material class region, if the following conditions are fulfilled:

$\tau_{ROI,mean,min} \leq \text{mean}_{ROI} \leq \tau_{ROI,mean,max}$ $\tau_{ROI,Min} \leq \text{min}_{ROI}$ $\tau_{ROI,Max} \geq \text{max}_{ROI}$ wherein therefore the average image datum should lie in a material class interval of the attenuation values, which presently is chosen by $\tau_{ROI,mean,min}$=−50 HU and $\tau_{ROI,mean,max}$=100 HU to be narrower than the rough estimation interval, in order to locate with certainty if possible the regions in which the material class, so soft tissue, is formed. The values $\tau_{ROI,Min}$ and $\tau_{ROI,Max}$ describe the maximum deviation that is permitted.

To mark a candidate region as a material class region, a "flag" can be set as a Boolean Variable, which specifies that the material class region in the following fit is used to calculate the homogenization function.

As an optional embodiment, in particular in order to cover particular ratios in the edge image slices, it can be provided that the number of material class regions is finally checked. If the total number of material class regions is smaller than a predetermined first threshold value and/or the total number of material class regions in a quadrant defined by the focus is smaller than a predetermined second threshold value, the criterion concerning the average image datum can also be dropped, which means that it is sufficient for a classification as a material class region, if $\tau_{ROI,Min} \leq \text{min}_{ROI}$ $\tau_{ROI,Max} \geq \text{max}_{ROI}$ applies, wherein, however, finally $\text{mean}_{ROI}$ is specified as the target value. This last measure means that the following fit for the image slice homogenization function prefers H(x, y, z)=1, therefore no change. In this way situations should be avoided in which the fit behaves uncontrollably, because the number of material class regions is not sufficient, for example in the lower region of the skull.

If image slices of a size of 512×512 pixels are considered, the first threshold value can be chosen as 16 and the second threshold value as 4.

In a step 9 the calculation of the image slice homogenization function $H_z(x, y, z)$ then occurs, wherein later a multiplicative homogenization function H(x, y, z) should be determined from this, which can be applied to all voxels of the image data set, such that corrected image data g' can be calculated generally according to $$g'(x,y,z) = H(x,y,z) \cdot g(x,y,z).$$

The ultimate goal is that, for the material class regions located above, the target value defined above is received as an average image datum of image data g', such that homogeneous artifacts such as cupping artifacts and capping artifacts, as well as image data trends (for example because of a patient table), are avoided.

In step 9, for each image slice, an image slice homogenization function is therefore firstly determined by a fit as part of an optimization method. In the represented exemplary embodiment, the approach $$H_z(x, y, z) = a_0(z) + a_1(z) \cdot \theta(x - x_C) \cdot \left(\frac{x - x_C}{N_x}\right)^2 + a_2(z) \cdot \theta(x_C - x) \cdot \left(\frac{x - x_C}{N_x}\right)^2 +$$
$$a_3(z) \cdot \theta(y - y_C) \cdot \left(\frac{y - y_C}{N_y}\right)^2 + a_4(z) \cdot \theta(y_C - y) \cdot \left(\frac{y - y_C}{N_y}\right)^2 +$$
$$a_5(z) \cdot \left[\exp\left(a_6(z) \cdot \left(\left(\frac{x - x_C}{N_x}\right)^2 + \left(\frac{y - y_C}{N_y}\right)^2\right)\right) - 1\right]$$

is chosen. Therein the Heaviside function (1 for positive, 0 for negative argument) is used in such a way that the first four terms permit varying corrections in varying directions starting from the focus, but merge smoothly into one another at the focus. At the focus the image slice homogenization function is evidently determined by the parameter $a_0$. A total of seven parameters $a_i$ exist. z is fixed for each image slice.

The last term (exponential term) increases or decreases with the distance from the focus, therefore in some way replicating cupping artifacts. The other terms (polynomial terms) can, for example, correct the increasing or decreasing image data of the material class in a direction through the image slice.

It is optional at this point to again check whether sufficient material class regions are present, cf. above, first and second threshold value. If this is not the case, as a precaution, the image slice homogenization function for this image slice can be set at $H_z(x, y, z)=1$.

If sufficient material class regions are present, the cost function is defined as $$K = \sum_{Material class regions} (Targetvalue - H_z(x_{ROI}, y_{ROI}, z) \cdot mean_{ROI})^2,$$

wherein $x_{ROI}$ and $y_{ROI}$ give the position of the respective material class region. The unknown function parameters $a_i(z)$ are determined, in particular otherwise starting from $a_0(z)=1$ and $a_i(z)=0$, by the requirement that the cost function K is minimized. Therefore a Downhill Simplex algorithm can, for example, be used. In order to be sure that no local minimum is located, the optimization method can be initiated several times, for example three times.

There is also a step 10, in which the image slice homogenization function is restricted, presently via:

If $H(x,y,z) \geq Thres\_H\_Max$, then $H(x,y,z) = Thres\_H\_Max$ and

If $H(x,y,z) \leq Thres\_H\_Min$, then $H(x,y,z) = Thres\_H\_Min$.

The admissibility interval, defined by Thres_H_Max and Thres_H_Min, is in this case presently defined at one, such that Thres_H_Max=1.2 and Thres_H_Min=0.8. It is thus ensured that the image slice homogenization function lies in a sensible framework. Together with the smoothness of the image slice homogenization function, this increases the robustness of the method.

In a step 11 it is then checked, whether yet further image slices are to be processed. If this applies, a new image slice is chosen in a step 11a and then the method proceeds again with step 6.

If all of the image slices are processed, the final homogenization function H(x, y, z) for all of the image data is calculated in a step 12. This homogenization function should also be smooth between the image slices, so in the z direction (dividing direction). For this purpose a moving average is formed, in the case of which $N_{SA}=5$ neighboring image slices are considered on both sides respectively.

$$H(x, y, z) = \frac{1}{2N_{SA}+1} \sum_{i=-N_{SA}}^{N_{SA}} H_z(x, y, z+i)$$

The application of the homogenization function finally occurs in a step 13, wherein it is actually desired to apply the homogenization function to the regions of the material class, so here the soft tissue. Other regions could simply lead to a transition that is not smooth in an exclusionary manner, such that an attenuated application of the homogenization function outside an application interval of the attenuation values is suggested, which is chosen to be wider than the rough estimate interval, for soft tissue, for example from $\tau_{Pixel,Min\_for\_H}=-100$ HU to $\tau_{Pixel,Max\_for\_H}=400$ HU. Specifically the application is carried out according to $$g'(x, y, z) = \begin{cases} H_{SA}(x, y, z) \cdot g(x, y, z), & \text{if } \tau_{Pixel,Min\_for\_H} \leq g(x, y, z) \leq \tau_{Pixel,Max\_for\_H} \\ \exp(\ln H_{SA}(x, y) \cdot \tau_{Pixel,Max\_for\_H}/g(x, y, z)) \cdot g(x, y, z), & \text{if } g(x, y, z) \geq \tau_{Pixel,Max\_for\_H} \\ \exp(\ln H_{SA}(x, y) \cdot g(x, y, z)/\tau_{Pixel,Min\_for\_H}) \cdot g(x, y, z), & \text{if } g(x, y, z) \leq \tau_{Pixel,Min\_for\_H} \end{cases}$$

In this case it accepted that the image data deviates by an offset of the HU values, in such a way that they are always positive (offset, for example, 1024). Then the high image data and low image data are (approximately) multiplied by one, therefore are not changed. The desired main application to the regions representing the material class is given.

Also in step 13 a region check can take place, as the image data g' can lie outside the acceptable region, such that, for example, in the case of a minimum value for the image data being present, all image data g' lying underneath the minimum value is set to the minimum value, and analogously in the case of the presence of a maximum value, all image data lying over the maximum value can be set to the maximum value.

Then a representation of the image slices can occur.

FIG. 3 shows, in the same way as FIG. 1, a schematic diagram of an image slice 1 corrected with the method according to the invention. Evidently, the entire region 14 lying inside the cranium 3 is adapted in its grey values, such that the cupping artifact disappears. Because, however, of the smooth and restricted nature of the homogenization function, the structures 5 are still clearly visible.

Finally, FIG. 4 shows a schematic diagram of computing facility 15 according to the invention, which is formed for carrying out the method according to the invention. For this purpose the computing facility 15 firstly has a target value and focus determination unit 16 for carrying out the steps 6 and 7. Material class regions are located in a location unit 17 according to step 8. The image slice homogenization function determination unit 18 is formed for carrying out the steps 9 and 10. A central control unit 19 can control the entire procedure of the method according to the invention in the computing facility 15 and cause the steps 6 to 10 to be carried out for all image slices through the choice of a new image slice (step 11a). A homogenization function determination unit 20 then calculates the homogenization function according to step 12, whereupon this can be applied according to step 13 by a homogenization function application unit 21 (correction unit).

The computing facility 15 can be a part of an image method or of an x-ray device, in particular an x-ray device having a C-arm, on which an x-ray emitter and an x-ray detector, which are lie opposite one another, are arranged. Furthermore it is noted that the method according to the invention can also be realized as a computer program, which carries out the method according to the invention, if it is carried out on a computing facility such as the computing facility 15. The computer program can be deposited onto a non-transient data medium, for example a CD.

Although the invention was illustrated and described in more detail by the preferred exemplary embodiment, the invention is not limited in this way by the disclosed examples and other variations can be derived by the person skilled in the art, without exceeding the scope of protection of the invention.

We claim:

1. A method for the reduction of artifacts based on an unequal representation of the same material classes in various locations in a three-dimensional image data set, reconstructed from two-dimensional x-ray projection images in which an image datum describing an attenuation value is allocated respectively to a voxel, the method performed by a computer processor and comprising:
    locating at least two material class regions in a post-processing step, which receive image data which is homogeneously distributed and lies in an expected material class interval of the attenuation values;
    considering a characteristic of the material class regions and determining a smooth homogenization function, which is to be applied to the image data of the entire image data set; and
    applying the smooth homogenization function to the image data of the image data set,
    wherein the image data set is divided into image slices along a division direction, and
    wherein an image slice homogenization function is determined for each image slice and the homogenization function for the entire image data set is derived from the image slice homogenization function.

2. The method as claimed in claim 1, wherein, before carrying out the post-processing step, an algorithm for a reduction of artifacts on the projection images and the image data set has been applied and, the post-processing step is the last step of a post-processing procedure before a representation of the image data set.

3. The method as claimed in claim 1, wherein, before carrying out the post-processing step, an algorithm for a reduction of artifacts on the projection images or the image data set has been applied or the post-processing step is the last step of a post-processing procedure before a representation of the image data set.

4. The method as claimed in claim 1, wherein the three-dimensional image data set, which shows a head of a person, is used.

5. The method as claimed in claim 1, wherein the image slice homogenization function is calculated as a moving average via the image slice homogenization function.

6. The method as claimed in claim 5, wherein the homogenization function is calculated as a moving average via the image slice homogenization function by filters with a low-pass filter in the division direction.

7. The method as claimed in claim 1,
    wherein first a focus of the image slice and a target value is determined for each image slice,
    wherein a central region lying around the focus is determined for the calculation of the target value, for which an average attenuation value is specified as the target value, or the target value is specified as a value expected for the material class.

8. The method as claimed in claim 7, wherein for the determination of the focus, the image slice is binarized by means of an object threshold value describing an attenuation value of an object represented in the image slice.

9. The method as claimed in claim 7, wherein for the determination of the average attenuation value, only image data of the central region is considered, which lies in a rough estimate interval that is dependent on the material class.

10. The method as claimed in claim 7,
    wherein for each image slice, evenly distributed candidate regions or candidate regions covering the entire image slice are defined and for each candidate region an average image datum, a maximum image datum and a minimum image datum are calculated via the pixels in the candidate region, and
    wherein a candidate region is determined as a material class region, when the average image datum in which the material class interval lies, the minimum is larger than a predetermined minimum value and the maximum is smaller than a predetermined maximum value, and
    wherein the minimum value and the maximum value describe acceptable deviations for the material class.

11. The method as claimed in claim 10,
    wherein then, when the total number of the material class regions is smaller than the predetermined first threshold value or the total number of material class regions in a quadrant, defined by the focus, is smaller than a predetermined second threshold value, candidate regions are also used as material class regions, for which the minimum is larger than the predetermined minimum value and the maximum is smaller than the predetermined maximum value, and
    wherein for these material class regions the average image datum is specified as the target value.

12. The method as claimed in claim 10,
    wherein for each image slice the function parameters describing the image slice homogenization function are calculated in an optimization procedure, and
    wherein a cost function is set as a sum of the deviations of the average image data of the target value, multiplied by the homogenization function at the location of the material class region.

13. The method as claimed in claim 12, wherein the image slice homogenization function is set such that it always results in the target value for the focus.

14. The method as claimed in claim 12, wherein, in a case in which the total number of the material class regions is smaller than a predetermined first threshold value or the total number of material class regions in a quadrant, defined by the focus is smaller than a predetermined second threshold value, the image slice homogenization function is specified for the entire image slice as multiplication by one.

15. The method as claimed in claim 1,
    wherein first a focus of the image slice or a target value is determined for each image slice,
    wherein a central region lying around the focus is determined for the calculation of the target value, for which an average attenuation value is specified as the target value, or the target value is specified as a value expected for the material class,
    wherein the target value is a Hounsfield Unit value.

16. The method as claimed in claim 1,
    wherein the homogenization function is restricted to an admissibility interval of one, described by a maximum distance, before its multiplicative application to the image data, and wherein the maximum distance is chosen between 0.1 and 0.3.

17. The method as claimed in claim 16, wherein the maximum distance is 0.2.

18. The method as claimed in claim 1, wherein the homogenization function is only applied to an application interval, which contains the material class interval, of possible attenuation values or the application of the homogenization function is continued in an attenuating manner with increasing distance from the application interval by the smooth continuation outside the application interval.

19. A computing facility for the reduction of artifacts based on an unequal representation of the same material classes in various locations in a three-dimensional image data set, reconstructed from two-dimensional x-ray projection images, wherein an image datum, describing an attenuation value is allocated respectively to a voxel, the computing facility comprising:

a location unit for the location of at least two material class regions containing image data, homogeneously distributed and which lies in an expected material class interval of the attenuation values;

a homogenization function determination unit for the determination of a smooth homogenization function, which is applied to the image data of the entire image data set, considering at least one characteristic of the material class regions; and a correcting unit for the application of the homogenization function to the image data of the image data set, wherein the image data set is divided into image slices along a division direction, and wherein an image slice homogenization function is determined for each image slice and the homogenization function for the entire image data set is derived from the image slice homogenization function.

\* \* \* \* \*